(12) United States Patent  
Korkowski et al.

(10) Patent No.: US 8,416,535 B2  
(45) Date of Patent: Apr. 9, 2013

(54) ENDCAP FOR REDUCING AIRFLOW EXCITATION OF HEAD GIMBAL ASSEMBLY

(75) Inventors: Kurt J. Korkowski, Carver, MN (US); Lance L. Thoresen, Burnsville, MN (US); Xiaohong Sun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 2137 days.

(21) Appl. No.: 10/758,330

(22) Filed: Jan. 15, 2004

(65) Prior Publication Data

US 2005/0157430 A1    Jul. 21, 2005

(51) Int. Cl.
*G11B 21/08* (2006.01)

(52) U.S. Cl.
USPC ............................................... 360/265.9

(58) Field of Classification Search ............... 360/265.9, 360/244.5
See application file for complete search history.

(56) References Cited

U.S. PATENT DOCUMENTS

| | | | |
|---|---|---|---|
| 4,189,759 A * | 2/1980 | Bauck et al. | 360/244.9 |
| 4,473,855 A | 9/1984 | Plotto et al. | |
| 4,879,618 A | 11/1989 | Iida et al. | |
| 6,381,101 B1 * | 4/2002 | Mohajerani et al. | 360/254.7 |
| 6,496,327 B2 | 12/2002 | Xia et al. | |
| 6,549,365 B1 | 4/2003 | Severson | |
| 6,570,742 B2 | 5/2003 | Korkowski et al. | |
| 6,597,539 B1 * | 7/2003 | Stupp et al. | 360/245.7 |
| 6,661,615 B2 | 12/2003 | Tsuda | |
| 6,704,164 B1 * | 3/2004 | Hiraoka | 360/244.8 |
| 6,714,386 B1 * | 3/2004 | Polycarpou et al. | 360/265.1 |
| 6,950,282 B2 * | 9/2005 | Yim et al. | 360/245.5 |
| 6,950,285 B2 * | 9/2005 | Wada et al. | 360/265.7 |
| 6,958,890 B1 * | 10/2005 | Lin et al. | 360/244.6 |
| 6,961,218 B1 * | 11/2005 | Lin et al. | 360/266 |
| 7,023,667 B2 * | 4/2006 | Shum | 360/294.3 |
| 2002/0097525 A1 | 7/2002 | Rao et al. | |
| 2002/0196581 A1 | 12/2002 | Tsang et al. | |
| 2003/0072103 A1 | 4/2003 | Kang et al. | |
| 2003/0099068 A1 | 5/2003 | Budde | |
| 2003/0218833 A1 * | 11/2003 | Nagahiro et al. | 360/265.9 |

* cited by examiner

*Primary Examiner* — Mark Blouin
(74) *Attorney, Agent, or Firm* — Kagan Binder, PLLC

(57) ABSTRACT

An endcap for use on an actuator arm carrying a single head gimbal assembly, the endcap comprising a body, and a shielding feature extending from the body for reducing windage excitation of the head gimbal assembly.

20 Claims, 8 Drawing Sheets

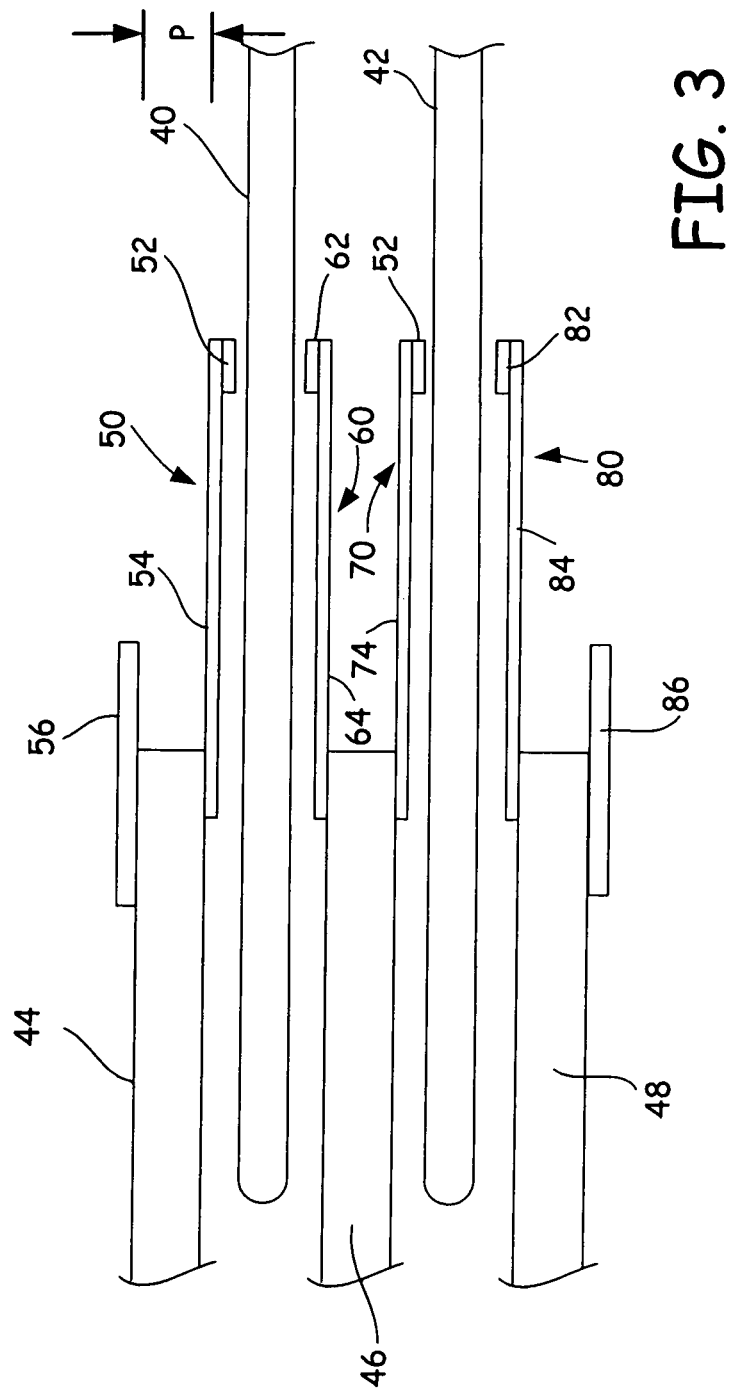

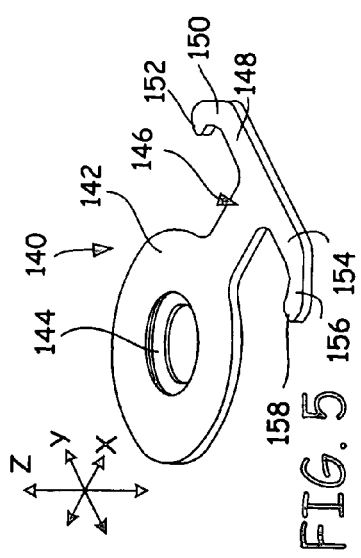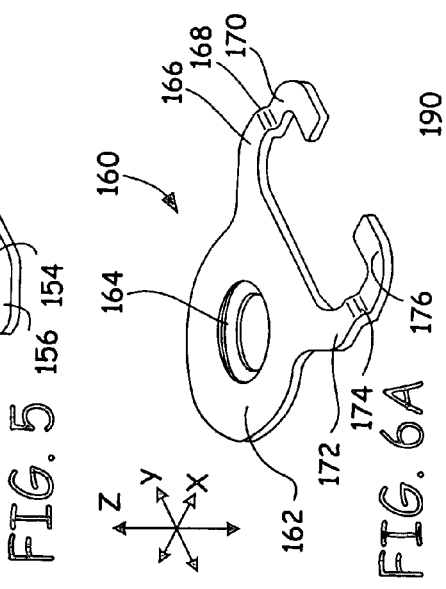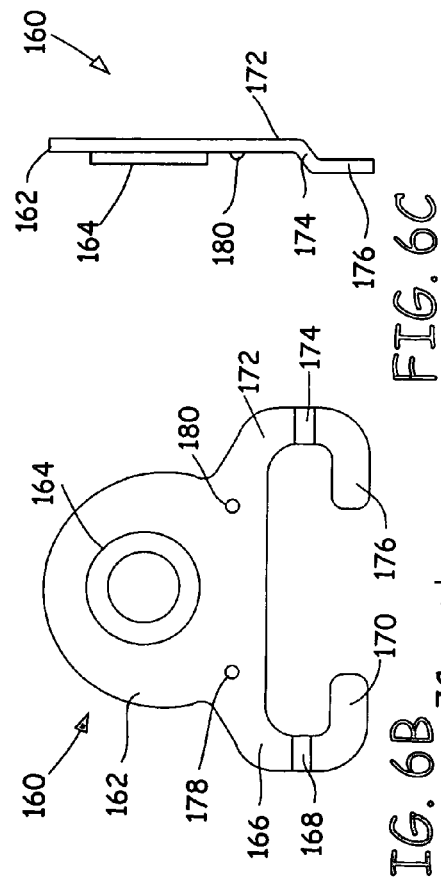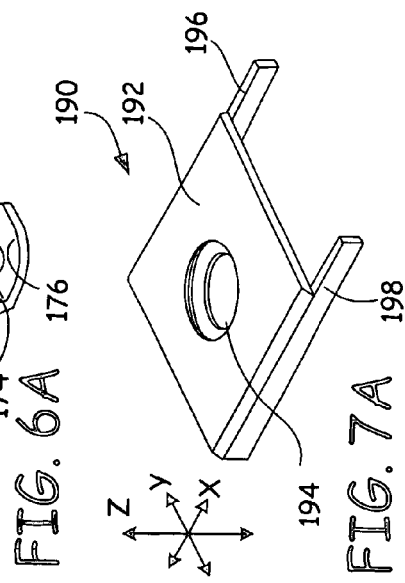

ENDCAP FOR REDUCING AIRFLOW EXCITATION OF HEAD GIMBAL ASSEMBLY

BACKGROUND OF THE INVENTION

The present invention relates to data storage and retrieval systems, and more particularly to a head gimbal assembly having reduced airflow excitation.

Hard disc drives (HDDs) are well known in the art and comprise one or more discs, each disc having several concentric data tracks for storing data. When multiple discs are used, a stack is formed of co-axial discs having generally the same diameter. A transducing head carried by a slider is used to read from or write to a data track on a disc. The slider is carried by an actuator arm. As the disc is spun, the slider glides above the surface of the disc. The actuator arm, also known as a block arm or pivot housing arm, movably positions the slider with respect to the disc. A plurality of actuator arms may be connected to a common E-block for common rotation. The slider, suspended on the actuator arm, is positioned above a data track on the disc by moving the actuator arm about an axis using a large-scale actuation motor, such as a voice coil motor.

The slider is mounted on the actuator arm using a head gimbal assembly (HGA). A standard HGA comprises a baseplate, a load beam, a gimbal, a flexible interconnect circuit, and the slider. The load beam provides the main support structure for the HGA. The baseplate connects the load beam to the actuator arm, the baseplate also being swaged to the actuator arm. The baseplate is often connected to a bottom side of the load beam. In other embodiments, the baseplate is connected to an opposite (top) side of the load beam. In still further embodiments, a second baseplate is connected to the top of the load beam.

The gimbal is attached to the load beam opposite the baseplate. The gimbal and baseplate are each attached to the load beam by methods known in the art, such as spot welding. The slider is supported by the gimbal. The gimbal is designed to flex, allowing the slider to follow the surface of the disc more closely than if the slider were mounted directly on the load beam. The slider supports a transducing head, which may be a magnetoresistive (MR) element, for reading and/or writing to the data tracks on the disc.

The flexible interconnect circuit is located on one side of the load beam and provides the circuitry to and from the transducing head in the form of leads and traces. The leads and traces connect the flexible interconnect circuit to the slider and thus allow electronic signals to pass between the transducing head carried on the slider and the flexible interconnect circuit. The flexible interconnect circuit can have formations along its length, such as an elbow.

The number of discs utilized in a particular HDD system varies, and one or more discs may be used according to the desired storage configuration. As such, disc locations may be left empty to provide smaller storage capacities while minimizing manufacturing costs by utilizing a common housing and E-block structure. Further, the number of HGAs may be varied, allowing one or more HGAs to access each disc. Generally, one HGA is positioned relative to each side of every disc. Because an actuator arm can hold multiple HGAs, a single actuator arm disposed between two parallel, co-axial discs of generally the same diameter may have two HGAs attached, with the HGAs attached to opposite sides of the actuator arm. Thus, the single actuator arm is disposed between opposing faces of the two discs, allowing transducing heads on the two attached HGAs to access the opposed faces of the two discs.

Other actuator arms in the same HDD may have only a single HGA attached, such as when an actuator arm is disposed to access the outermost face of the outermost disc in a stack or to access an inner face of a disc in a stack where no other disc face is located nearby. Endcaps, which may also be referred to as swage plates or base plates, are used to balance actuator arms having a single HGA attached. Such endcaps provide balance to actuator arms in X, Y and Z directions about a centerline of the actuator arm, generally by matching thickness and weight characteristics of the endcap to thickness and weight characteristics of the HGA. Additionally, endcaps provide protection from distortion of the actuator arm during HDD fabrication. In particular, endcaps reduce a risk of distortion of the actuator arm while components are mechanically attached to the actuator arm.

Endcaps are connected to an end of the actuator arm where an HGA might otherwise be attached. Known endcaps generally have a swage hole centered on the endcap to mechanically swage the endcap to the actuator arm. Thus, an actuator arm in a single HGA configuration has the HGA and the endcap disposed on opposite sides of the end of the actuator arm. Endcaps may also be attached to either an upper or a lower side of an actuator arm devoid of HGAs.

As a spindle rotates the magnetic disc at a high speed, air movement adjacent a surface of the magnetic disc is accelerated to create a disc "wind." The wind generally co-rotates with the disc. The co-rotating wind approaches an upstream portion of the actuator arm assembly defined as a windward side of the actuator arm assembly.

While a boundary layer of air generally co-rotates with the motion of the disc surface in a substantially symmetric manner, asymmetrical air flows can develop at or near the outer diameter of the rotating disc. Devices such as environmental control modules (ECMs), shrouds, fins and/or air dams may be used to control airflow both over the surface of the disc and beyond the outer diameter edge of the disc. However, manufacturing tolerances leave a significant gap between the outer edge of the rotating disc and the ECM, shrouds, fins and/or air dams. Current HDD designs generate significant turbulence at the outer diameter of the rotating disc.

When the HGA is positioned at or near the outer diameter of the disc, airflow can become turbulent at and around the HGA. Airflow can be especially turbulent where a portion of the HGA overhangs the outer diameter edge of the disc. At or near the outer diameter of the disc, air turbulence in the form of eddies, shedding, and other phenomena may cause excitation and vibration of the HGA. Excitation and vibration of the HGA can result in off-track movement of the transducing head. Specifically, discrete portions of the HGA can resonate, with those vibrations causing off-track movement by the entire HGA.

Windage excitation of the HGA when the HGA is at or near the outer diameter of the disc is most problematic when a single HGA is attached to the actuator arm. This may be because dual HGA configurations, meaning actuator arms having two HGAs attached on either side of the actuator arm, exhibit less windage excitation problems. Dual HGA configurations provide inherent shielding from air turbulence as the HGAs shields each other. Thus, "dummy" HGA attachments could be used to provide both balance and shielding, where on an actuator arm one HGA functions to access data and the other is a "dummy" assembly providing only balancing and shielding functionality. However, such a configuration is undesirable because the high cost of HGAs makes the use of a "dummy" HGA expensive and impractical.

Vibration of the HGA may be measured as non-repeatable runout (NRRO), which measures non-repeatable vibration due to random factors. As the recording density of magnetic discs continues to increase, the width or pitch of the tracks on the disc must decrease. This makes it increasingly difficult to hold the HGA above the selected data track. As track width or pitch becomes small, measured NRRO becomes large relative to the track pitch. Thus, the performance of the disc drive is more sensitive to errors caused by NRRO.

Thus, there is a need in the art for a disc drive design to control the amount of airflow excitation at the HGA to reduce NRRO.

BRIEF SUMMARY OF THE INVENTION

The present invention relates to a head actuation system for radially positioning a transducing head over a selected track of a rotatable disc. Namely, the present invention relates to an endcap for use on an actuator arm carrying a single head gimbal assembly, the endcap comprising a body, and a shielding feature extending from the body for reducing windage excitation of the head gimbal assembly.

BRIEF DESCRIPTION OF THE DRAWINGS

FIG. 3 is a schematic representation of three actuator arm assemblies and a stack of rotatable discs.

FIG. 5 is a perspective view of a second embodiment of a shield.

FIG. 6A is a perspective view of a third embodiment of a shield.

FIG. 6B is a bottom view of a third embodiment of a shield.

FIG. 6C is a left side view of a third embodiment of a shield.

FIG. 7A is a perspective view of a fourth embodiment of a shield.

FIG. 7B is a bottom view of a fourth embodiment of a shield.

FIG. 7C is a cross-section view of a shield taken along line 7C-7C of FIG. 7B.

DETAILED DESCRIPTION

Figure 1:
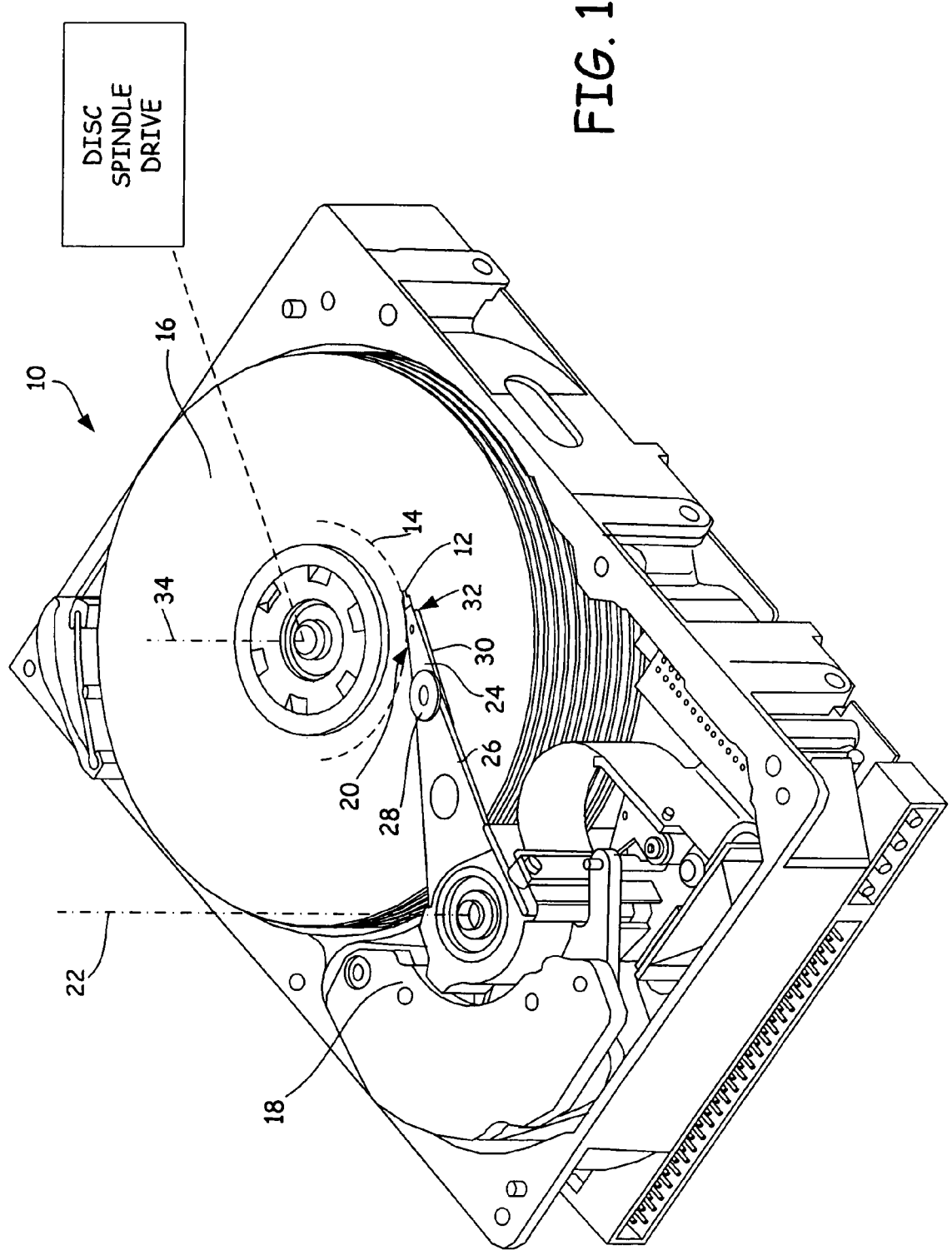
FIG. 1 is a perspective view of a rotary disc drive.

FIG. 1 is a perspective view of a disc drive actuation system 10 for positioning a slider 12 over a selected data track 14 of a magnetic storage medium 16, such as a disc. The actuation system 10 includes a voice coil motor (VCM) 18 arranged to rotate a head gimbal assembly (HGA) 20 about an axis 22. The HGA 20 includes a load beam 24 supported by an actuator arm 26 at a baseplate (not shown). An endcap 28 is attached to a side of the actuator arm 26 facing away from the disc 16. A flexible gimbal (not shown) is connected to an extended end of the load beam 24, and carries the slider 12. The slider 12 carries a magnetoresistive (MR) element (not shown) for reading and a magnetic writer for writing data on the selected track 14 of the disc 16. A flexible interconnect circuit 30 disposed under the actuator arm 26 electrically connects the slider 12 and components located on or near the actuator arm 26.

The flexible interconnect circuit 30 is formed with an elbow portion 32 along a length of the flexible interconnect circuit 30. Many types of flexible interconnect circuits are known in the art, including a Flex on Suspension (FOS), a Trace Suspension Assembly (TSA) and a standard flex circuit. These different types of flexible interconnect circuits are functionally similar, and for present purposes may be considered interchangeable.

The disc 16 can be rotated about an axis 34, which causes the slider 12 to "fly" a small distance above the surface of the disc 16. To position the slider 12 at a selected track 14 on the disc 16, the VCM 18 actuates the HGA 20 about the axis 22 so that the HGA 20 is moved in an arc across the surface of the disc 16. This arc-shaped movement allows the slider 12 to be moved from an inner diameter to an outer diameter of the disc 16 so that the slider 12 can be positioned above the selected track 14 on the disc 16. A variety of sources of positioning error appear as the disc 16 is rotated, including windage-driven vibrations caused by airflow at or near the HGA 20 as the disc 16 rotates. This positioning error is measured as non-repeatable runout (NRRO). It is desired to reduce NRRO caused by airflow excitation of the HGA 20.

Figure 2A:
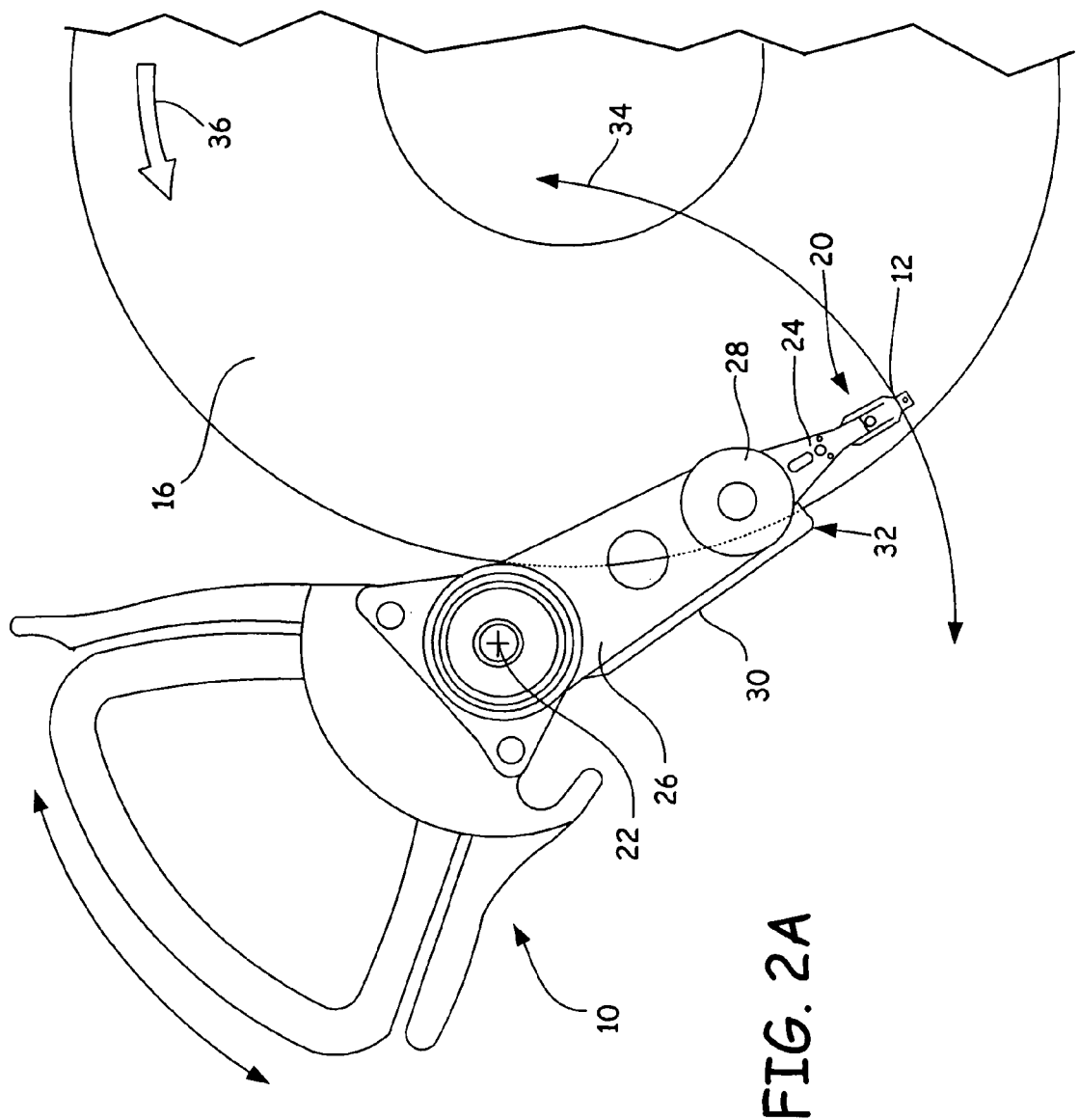
FIG. 2A is a top view of an actuator arm assembly showing the actuator arm in a first position relative to a rotatable disc.
Figure 2B:
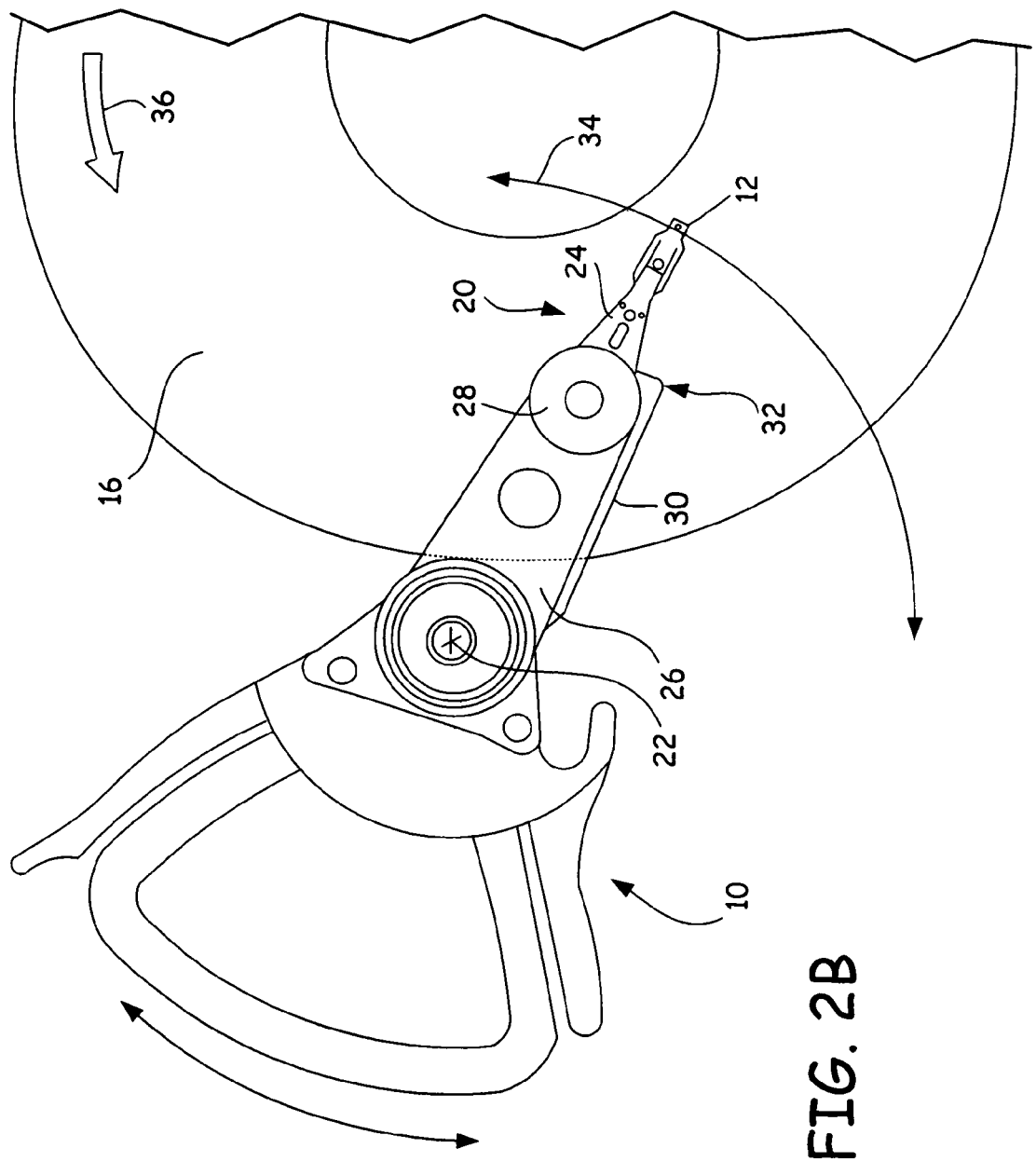
FIG. 2B is a top view of an actuator arm assembly showing the actuator arm in a second position relative to a rotatable disc.
Figure 2C:
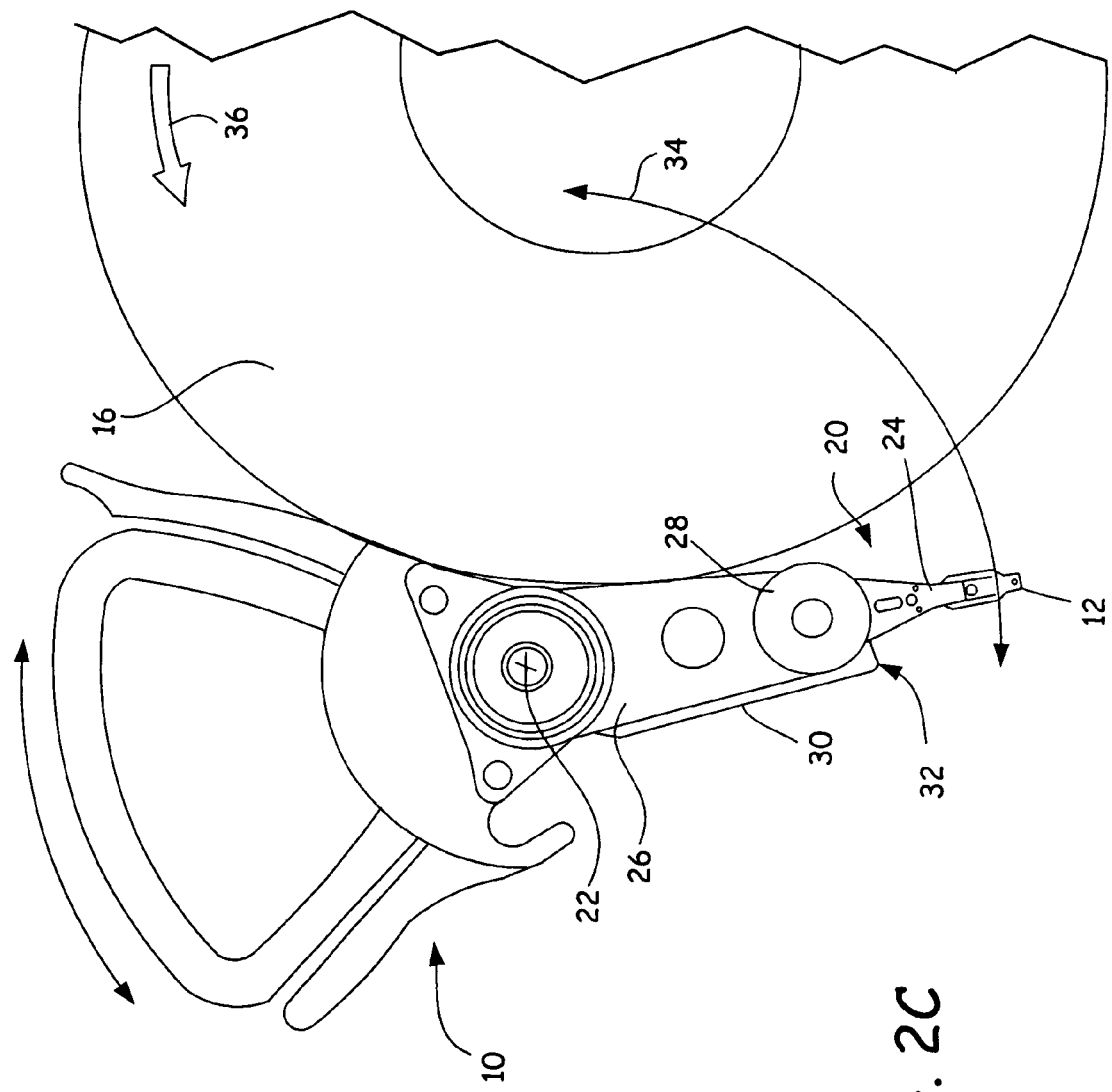
FIG. 2C is a top view of an actuator arm assembly showing the actuator arm in a third position relative to a rotatable disc.

FIGS. 2A-2C are top views of a portion of the disc drive actuation system 10 of FIG. 1 showing the HGA 20 in three different positions. As discussed above, the actuation system 10 shown in FIG. 2A positions the slider 12 over a data track of the disc 16. The actuator arm 26 may rotate clockwise and/or counterclockwise about the axis 22 both to position the attached HGA 20 relative to the disc 16 along an arc shaped path 34.

FIG. 2A shows a top view of a portion of the disc drive actuation system 10 with the HGA 20 located in a first position. In FIG. 2A, the HGA 20 is located at the outer diameter of the disc 16. In this position, the HGA 20 is disposed to access data tracks near the outer diameter of the disc 16. In this position, the elbow portion 32 of the HGA 20 is located past the outer diameter of the disc 16.

FIG. 2B shows the HGA 20 located in a second position. Rotating the actuator arm 26 about axis 22 has moved the attached HGA 20 along the arc shaped path 34. In the second position shown in FIG. 2B, the slider 12 is located near the inner diameter of disc 16. In this position, the HGA 20, including the elbow 32, is located entirely above the disc 16.

FIG. 2C shows the HGA 20 located in a third position. In FIG. 2C, the HGA 20 is located such that the slider 12 and the elbow 32 are located past the disc 16. This position is suitable for resting, manufacturing, or reworking. When in this position, the HGA 20 cannot access data tracks on the disc 16, and rotation of the disc 16 has generally slowed or stopped. The HGA 20 may also be located elsewhere when rotation of the disc 16 has slowed or stopped. In other embodiments not illustrated, the HGA 20 or a portion of the HGA 20 may overhang the disc 16 while in a resting, manufacturing, or reworking position. For example, in HDDs with contact start/stop (CSS) configurations, the HGA 20 is in a resting position when the slider 12 is positioned at a textured landing zone located at the inner diameter of the disc 16.

FIGS. 2A-2C thus illustrate how the HGA 20 makes an arc shaped movement to access data tracks near the outer diameter of the disc 16, as shown in FIG. 2A, or access data tracks near the inner diameter of the disc 16, as shown in FIG. 2B. Furthermore, FIG. 2C shows the HGA 20 in a resting, manufacturing, or reworking position substantially beyond the outer diameter of the disc 16.

The disc 16 in FIGS. 2A-2C is rotatable in a counterclockwise direction, illustrated as an arrow 36. When rotated, an airflow or windage is generated near a surface of the disc 16. This airflow generally co-rotates with the disc 16. At an outer diameter of the disc 16, asymmetric airflows, including eddies, shedding effects and other phenomena, develop. When the elbow 32 is located beyond the outer diameter of the disc 16, as shown in FIG. 2A, the flexible interconnect circuit 30, as well as the other individual head gimbal assembly components, encounters turbulence due to the asymmetrical airflow patterns near the outer diameter edge of the disc 16. When only a single HGA is attached to the actuator arm 26, the turbulence causes excitation and vibration of the HGA 20. Excitation and vibration of the flexible interconnect circuit 30 may result in off-track movement of the slider 12, which holds the transducing head. Specifically, discrete portions of the HGA 20 resonate, with those vibrations causing off-track movement by the entire HGA 20.

Actuator arms 26 having a single HGA 20 attached arise in a variety of HDD configurations. FIG. 3 is a schematic view of an actuator arm system in a two-disc HDD, which comprises a stack of two discs and four HGAs. Shown in FIG. 3 are two rotatable discs 40 and 42, a first actuator arm 44, a second actuator arm 46, and a third actuator arm 48. A first HGA 50 is attached to the first actuator arm 44, the first HGA 50 including a slider 52 and a load beam 54. An endcap 56 is also attached to the first actuator arm 44, extending proximate the first HGA 50 such that the endcap 56 is located a distance P from the first HGA 50.

Attached to the second actuator arm 46 is a second HGA 60, which includes a slider 62 and a load beam 54, and a third HGA 70, which also includes a slider 72 and a load beam 74. Attached to the third actuator arm 48 is a fourth HGA 80. The fourth HGA includes a slider 82 and a load beam 84. Also attached to the third actuator arm 48 is an endcap 86.

The two discs 40 and 42 viewed in FIG. 3 are parallel, axially-aligned discs of generally the same diameter. The first disc 40 is located above the second disc 42. The first, second, and third actuator arms 44, 46, and 48 are located relative the first and second discs 40 and 42 to read from and write to the discs 40 and 42. Generally, the first, second, and third actuator arms 44, 46 and 48 are connected to a common E-block, which is rotatable. Thus, the first, second, and third actuator arms 44, 46 and 48 may be uniformly rotated together.

The first actuator arm 44 is located above the upper disc 40. The first HGA 50 is attached to a lower side of the first actuator arm 44, as viewed in FIG. 3, so that the slider 52 is positioned next to an upper surface of the first disc 40 for reading from or writing to the upper surface of the first disc 40. The endcap 56 is swaged to an upper side of the first actuator arm 44, opposite the first HGA 50.

The second actuator arm 46 is disposed between the first and second discs 40 and 42. The second and third HGAs 60 and 70 are attached to opposite sides of the actuator arm 46, with the second HGA 60 located above the third HGA 70. In this configuration, the second HGA 60 faces a lower side of the first disc 40 for reading from and writing to the lower side of the first disc 40. Also, the third HGA 70 faces an upper side of the second disc 42 for reading from and writing to the upper side of the second disc 42. Thus, the first and second HGAs 50 and 60 are disposed to access opposite faces of the first disc 40, and the third and fourth HGAs 70 and 80 are disposed to access opposite faces of the second disc 42.

Disposed below the lower disc 42 is the third actuator arm 48. The fourth HGA 80 is attached to an upper side of the third actuator arm 48. The fourth HGA 80 faces a lower side of the second disc 42 for reading from and writing to the lower side of the second disc 42. The endcap 86 is swaged to a lower side of the actuator arm 48, opposite the fourth HGA 80.

When an actuator arm is disposed between two co-axial discs, a pair of mirror-image HGAs may be disposed on a single actuator arm. Thus, FIG. 3 shows the HGAs 60 and 70 attached to the actuator arm 46 disposed between the discs 40 and 42. However, when an actuator arm is located at the top or bottom of a stack of discs, such as actuator arms 44 and 48 in FIG. 3, only a single HGA is generally attached. When only one HGA is attached to an actuator arm, the HGA is referred to as a single HGA. In FIG. 3, the first and fourth HGAs 50 and 80 are each single HGAs.

Those skilled in the art will recognize that the two-disc configuration shown in FIG. 3 may be altered to include almost any number of discs without departing from the spirit or scope of the present invention. Known HDD systems often utilize identical or similar housing and E-block assemblies in one-, two- or four-disc configurations, with one HGA positioned relative to each side of each disc. Thus, multiple storage configurations are possible, with discs and HGAs arranged like those shown in FIG. 3.

It is desired to balance any load placed on an end of an actuator arm. Endcaps 56 and 86 are generally attached to single HGA actuator arms, and thus are typically located on actuator arms at the top or bottom of a stack of discs. As illustrated in FIG. 3, the endcap 56 is attached to a top side of the first actuator arm 44, and the endcap 86 is attached to a bottom side of the third actuator arm 48. Endcaps may also be used at other locations as needed. Persons skilled in the art will recognize that endcaps may be placed on any actuator arm having only a single HGA attached, such as an actuator arm disposed in the interior of a stack of discs where only one disc is near the actuator arm. Furthermore, endcaps may be placed on actuator arms devoid of HGAs.

As rotation of the discs 40 and 42 creates an airflow, turbulence is generated near a outer diameters of the discs 40 and 42. While the airflow or windage generally co-rotates with the discs 40 and 42, turbulence develops at the outer diameters of the discs 40 and 42, due to asymmetric airflows, including eddies, shedding effects and other phenomena. This turbulence is particularly problematic with respect to actuator arms having single HGAs, such as the first and third actuator arms 44 and 48. Dual HGAs, such as the second and third HGAs 60 and 70 located on the second actuator arm 46, experience less turbulence problems, possibly due to the inherent shielding each HGA 60 and 70 provides for the other.

In order to reduce excitation of the single-HGA actuator arms 44 and 48, the endcaps 56 and 86 are utilized. The endcaps 56 and 86 in FIG. 3 extend beyond the actuator arms 44 and 48 to shield the single HGAs 50 and 80. The endcaps 56 and 86 are shaped and positioned relative to the HGAs 50 and 80 to reduce windage excitation of the single HGAs 50 and 80. The shaping and positioning of the endcap shields is described further below.

Figure 4:
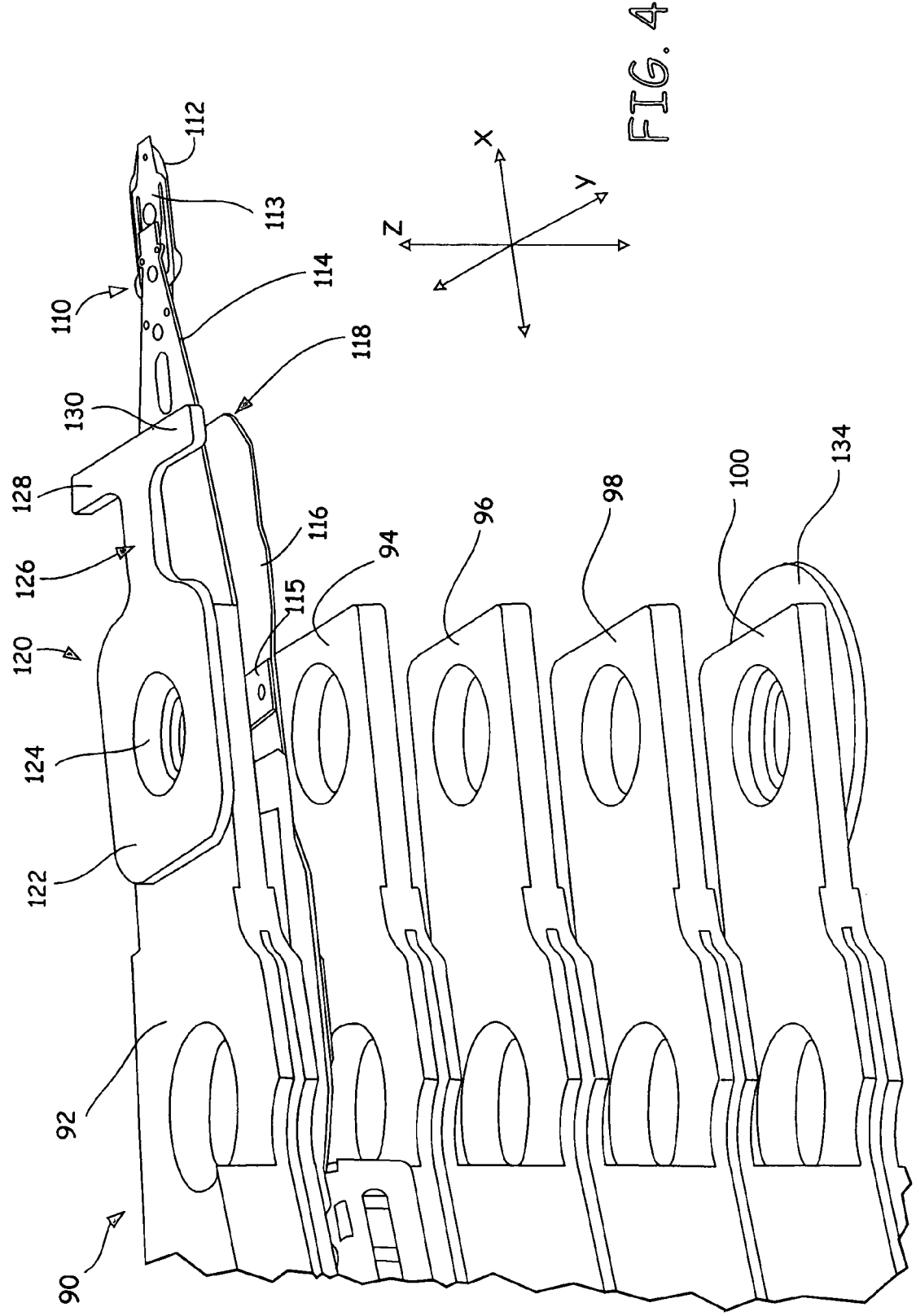
FIG. 4 is a perspective view of an actuator arm assembly with a first embodiment of an endcap shield.

FIG. 4 is a perspective view of an actuator arm assembly 90. The actuator arm assembly 90 comprises five actuator arms 92, 94, 96, 98 and 100 arranged in a parallel stack formation. A single HGA 110 is attached to an end of the uppermost actuator arm 92. For simplicity, the other actuator arms 96, 98 and 100 are shown without any HGAs attached. The HGA 110 includes a slider 112, a gimbal 113, a load beam 114, and a flexible interconnect circuit 116. The flexible interconnect circuit 116 has an elbow region 118 that protrudes from the HGA 110. Attached to the actuator arm 92 opposite the HGA 110 is an endcap 120. The endcap 120 has a body 122 with a swage hole 124 centered on the body portion 122. The endcap 120 also comprises a T-shaped shielding feature 126 that extends from the body 122, the shielding feature 126 having a balancing portion 128 and a shielding portion 130.

The HGA 110 is attached to a lower side of the actuator arm 92. The HGA 110 is located on the actuator arm assembly 90 to allow access to a disc that fits between actuator arms 92 and 94. The load beam 114 is supported by the actuator arm 92. The slider 112 is supported by the gimbal 113, with the gimbal 113 attached to the load beam 114. The load beam 114 is attached to a baseplate 115, with the baseplate swaged to the actuator arm 92. Spot welds may be used to attach the load beam 114 to the baseplate 115 and to the gimbal 113. The flexible interconnect circuit 116 electrically connects the slider 112 to components located on or near the actuator arm 92. Furthermore, the endcap 120 is swaged to an upper side of the actuator arm 92, opposite the HGA 110. In other embodiments, the endcap 120 is swaged to a lower side of the actuator arm 92.

The endcap 120 has a substantially planar configuration. The body 122 is substantially rectangular. However the body 122 is not limited to a rectangular shape, and may take on circular or other shapes as will be obvious to those skilled in the art. The shielding feature 126 extends from the body 122 in a substantially X-Y plane. The shielding feature 126 is shaped so the endcap 120 is symmetric with respect to the balancing portion 128 and the shielding portion 130 of the shielding feature 126, across an X axis that intersects a center of the endcap 120.

As discussed above, an actuator arm with a only a single HGA attached to one side of the actuator arm is unbalanced. Thus, to balance the actuator arm 92 in FIG. 4, the endcap 120 is attached to the actuator arm 92 opposite the HGA 110. The symmetry of the endcap 120 balances the load placed on the actuator arm 92, thereby reducing the possibility of off-track movement induced by unbalanced loading.

In operation, the HGA 110 illustrated in FIG. 4 may resonate due to windage excitation, namely windage excitation at an outer diameter of a disc. When the HGA 110 is positioned at the outer diameter, the elbow 118 of the flexible interconnect circuit 116 is past the disc; therefore, the elbow 118 is particularly susceptible to windage excitation. When the HGA 110 is near the outer diameter, as seen in FIG. 2A, windage excitation due to eddies and shedding effects can be significant. Because the actuator arm 92 in FIG. 4 has only a single HGA 110, there is no inherent shielding provided by a second, mirror-image HGA. Thus, the shielding feature 126 of the endcap 120 is provided to shield the HGA 110. The shape of the shielding feature 126 and the proximity of the shielding portion 130 to the elbow 94 of the flexible interconnect circuit 92 can control windage excitation of the HGA 110 caused by eddies and shedding effects. This reduces windage excitation of critical portions of the HGA 110 that can excite the entire HGA 110 and, in turn, cause off-track movements.

Asymmetric airflows near the actuator arm assembly 90 can travel in irregular patterns. At any given point, these asymmetric airflows have X, Y and Z vector components. The shielding feature 126 disposed in the X-Y plane shields the HGA 110 from a windage component that occurs in a substantially Z direction. This shielding reduces excitation of the HGA 110. Specifically, the shielding feature 126 shields the HGA 110 from a particular windage-induced resonance mode that causes undesirable NRRO.

The shielding portion 130 of the shielding feature 126 provides the majority of the shielding effect to the elbow 118, while the balancing portion 128 of the shielding feature 126 provides balance when the endcap 120 is placed at the end of the actuator arm 82. The shielding portion 130 and the balancing portion 128 are mirror images of each other, maintaining symmetry of the shielding feature 126. The location of the shielding portion 130 and the balancing portion 128 of the shielding feature 126 may be reversed depending on which portion of the HGA 110 is subject to windage excitation. Thus, the shielding portion 130 of the shielding feature 126 is located towards a windward side or a leeward side of the actuator arm assembly 90, depending where windage excitation of the HGA 110 is problematic.

Symmetry of the shielding feature 126 also permits attachment of the endcap 120 to either the upper or the lower side of an actuator arm while providing shielding at the same windward or leeward side of the actuator arm. In further embodiments, for example, the endcap 120 is mounted on the lower side of the actuator arm and the locations of the shielding portion 130 and the balancing portion 128 are reversed such that the shielding portion 130 shields an excitable portion of an HGA located at the leeward side of the actuator arm.

The shielding portion 130 of the endcap 120 in FIG. 4 is shaped according to the particular portions of the HGA 110 subject to windage excitation. For example, when the elbow 118 of the flexible interconnect circuit 116 is the excitable portion of the HGA 110, the shielding portion 130 has a shape formed in the X-Y plane to cover the elbow 118. The shielding portion 130, by extending in the X-Y pane to cover the elbow 118, provides the desired shielding by extending out over an excitable portion of the HGA 110, namely the elbow 118.

The endcap 120 may be composed of a metal or any other suitable substance, as known in the art. Conventional endcap manufacturing methods may be used to form the shielding feature 126 integrally with the body 122 as a unitary piece. The single-piece endcap 120 may then be attached to the actuator arm 92 using conventional methods known in the art, such as swaging.

The endcap 134 attached to actuator arm 100 is an illustration of an endcap not having shielding features. The endcap 134 may be used in conjunction with the endcap 120 of the present invention to balance an actuator arm without an HGA. Regions not subject to windage excitation may utilize endcaps without shielding features, such as the endcap 134 not having shielding features. However, in further embodiments, and endcap with shielding features could be attached to an actuator arm devoid of HGAs, for example the actuator arms 94-100.

FIG. 5 shows another embodiment of an endcap 140 of the present invention. In this embodiment, the endcap 140 has a circular body 142. A swage hole 124 is centered on the body 142. A shielding feature 146 extends from body 142. In this embodiment, the shielding feature 146 is shaped in a modified a "T" shape. A balance arm portion 148 extends outward from the shielding feature 146, with an angled portion 150 and a distal portion 152 extending therefrom. Similarly, a shielding arm portion 154 extends from the shielding feature 146, with an angled portion 156 and a distal portion 158 extending therefrom. The shielding feature 146 thus has a swept-back "T" shape, where the angled portions 150 and 156 and the distal portions 152 and 158 extend substantially towards the body 142 of the endcap 140.

The modified "T" shape of the shielding feature 146 is designed to match the particular shape of a critical region of an HGA subject to windage excitation. The shielding feature 146 may take any desired shape, and could be shaped to match a shape of the elbow 118 shown in FIG. 4. Once again, the shielding feature 146 is formed to be symmetric with respect to an X axis that intersects a center of the body 142, to better balance the endcap 140.

FIGS. 6A-6C show another embodiment of an endcap shield 160 of the present invention. As seen in FIG. 6A, the endcap 160 comprises a body 162 having a substantially circular shape, a swage hole 164 centered on the body 162, a first shape feature protrusion 166 that extends from the body 162, a first spacer portion 168 that extends in a downward Z direction from the first shape feature protrusion 166, and a first sunken distal end 170 that extends from the first spacer portion 168, a second shape feature protrusion 172 that extends from the body 162, a second spacer portion 174 that extends in a downward Z direction from the second shape feature 172, and second sunken distal end 176 that extends from the second spacer portion 174.

The pair of mirror-image shape features 166 and 172 in FIG. 6A extend symmetrically from the body 162. Togther, the shape feature protrusions 166 and 172, the spacer portions 168 and 174, and the sunken distal ends 170 and 176 form a symmetrical "C" shape against the body 162, with the sunken distal ends 10 and 176 angled toward the body 162. The first and second spacer portions 168 and 174 extend in substantially a Z direction. The sunken distal ends 170 and 176 are disposed in a plane parallel to an X-Y plane in which the body 162 sits.

The first and second spacer portions 168 and 174 serve to position the sunken distal ends 170 and 178 close to excitable portions of a disc drive assembly, such as proximate to the elbow 94 of the flexible interconnect circuit 92. Thus, the endcap 160 provides a shielding effect in closer proximity in the Z direction to excitable portions of an HGA, shown as distance P in FIG. 3.

Further, FIGS. 6B and 6C illustrate a pair of bosses 178 and 180 provided on the body 122. The bosses 178 and 180 are small detents positioned to contact an end of an actuator arm to which the endcap 160 is connected. Because endcaps are generally mechanically swaged to actuator arms, the connection permits the endcap to rotate about the swaged attachment. Rotational movement, or clocking, is undesirable because it can move the sunken distal ends 170 and 176 away from portions of an HGA in need of shielding. Thus, in order to prevent rotational movement of the endcap and maintain proper alignment of the endcap 160 with respect to the actuator arm to which endcap 160 is connected, the bosses 178 and 180 are positioned to abut the end of the actuator arm.

Those skilled in the art will recognize that the shape of the endcap 160 in FIGS. 6A-6C may be altered according to manufacturing and performance requirements while still remaining within the spirit and scope of the present invention.

FIGS. 7A-7C show another alternate embodiment of an endcap shield 190 of the present invention. As seen in FIG. 7A, the endcap 190 has a body 192 with a substantially rectangular shape. A swage hole 194 is centered on the body 192. Shielding features 196 and 198 extend from opposite sides of the body 192. The shielding features 196 and 198 are disposed in a Z direction, generally orthogonal to a X-Y plane in which the body 192 lies. Shielding features 196 and 198 are connected to the body 192 along both sides of the body 192. The shielding features 196 and 198 extend from the body 192 as required to provide shielding to critical areas of an HGA.

Further, FIGS. 7B and 7C illustrate a pair of bosses 200 and 202 located on the body 192. The bosses 200 and 202 are small detents positioned to contact an end of an actuator arm to which the endcap 190 is connected. As noted above, rotation of the endcap 190 is undesirable. The bosses 200 and 202 thus control the alignment of the endcap 190 with respect to the actuator arm.

The shielding feature 196 and 198 of the endcap 190 provide shielding from a windage component that occurs in a substantially Y direction. Either or both of the shielding features 196 and 198 may provide shielding to the HGA by diverting airflow away from an excitable portion of the HGA, typically structured to divert airflow at a windward side of the HGA. The symmetrical shape of the endcap 190 balances the load on an end of an actuator arm to which the endcap 190 is attached.

Those skilled in the art will recognize that shielding features for endcaps may be formed in additional shapes and configurations as needed requirements of particular disc drive head actuator systems. Many different shaped endcaps, including those with C-, E-, H-, M-, T-, U-, V-, or Y-shaped shielding features, may be used to provide control over windage excitation of head gimbal assemblies as well as to balance loads placed on the actuator arms.

Moreover, while the foregoing embodiments describe in detail an endcap having shielding features, the present invention could alternatively be incorporated into a baseplate in an HGA. This baseplate, as part of the HGA, would function both as a baseplate and as a shield. The baseplate is welded to a load beam. The baseplate is further swaged to an actuator arm. The baseplate may be located on a top or a bottom of the load beam. Any of the shields illustrated in FIGS. 5-7C and described above could be used as baseplate shields.

Figure 8:
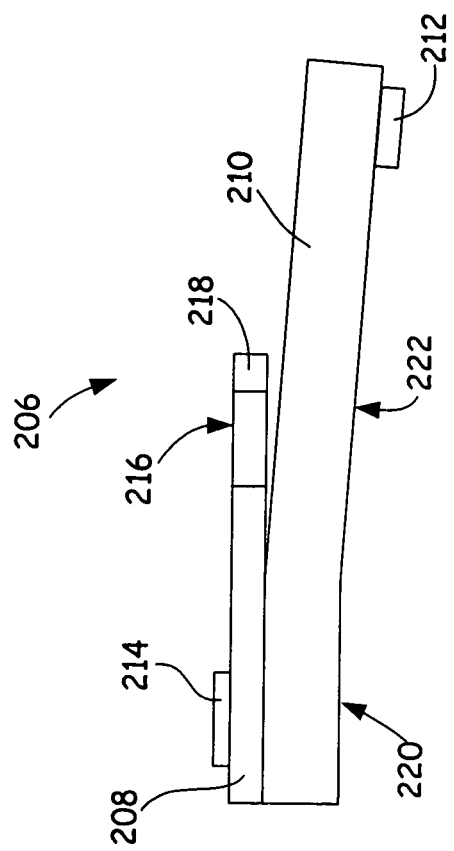
FIG. 8 is a schematic representation of a fifth embodiment of a shield.

FIG. 8 is a simplified schematic view of another embodiment of a HGA 206 comprising a baseplate 208, a load beam 210, and a transducing head 212. The baseplate comprises a swage hole 214 and a shielding feature 216. The shielding feature 216 includes a shielding portion 218. The shielding feature 216 shown in FIG. 8 has a "T" shape similar to the T-shaped shielding feature 126 in FIG. 4. The load beam 210 includes an arm attachment region 220 and an angled slider support region 222.

The load beam 210 is connected to the baseplate 208 at the arm attachment region 220 of the load beam 210, as described above with respect to other embodiments. The slider 212 is supported by the load beam 210 at the slider support region 222, opposite the arm attachment region 220. The slider support region 222 angled away from the baseplate 208 to better position the slider 212 relative a magnetic storage medium, such as a disc.

The shielding feature 216 of the baseplate 208 shields critical areas of the HGA 208 susceptible to windage excitation. The general shape and function of the baseplate 208 with shielding features would be the same as with endcaps shown in FIGS. 4-7C, with corresponding modifications to account for the location and proximity of shielding feature 216 with respect to slider support region 222 of HGA 206, and to provide desired shielding to critical areas of HGA 206. Thus, the teachings of the present invention may be applied to baseplates or endcaps, in the manner described in detail above.

Although the present invention has been described with reference to preferred embodiments, workers skilled in the art will recognize that changes may be made in form and detail without departing from the spirit and scope of the invention.

The invention claimed is:

1. An endcap for use on an actuator arm carrying a single head gimbal assembly that includes a load beam, wherein the endcap is connected to an end of the actuator arm to provide balancing, the endcap comprising:
a body of the endcap connected to the actuator arm at a side of the actuator arm facing away from the load beam; and
a shielding feature extending from the body in a cantilevered configuration for reducing windage excitation of the head gimbal assembly.

2. The endcap of claim 1, wherein the shielding feature includes a balancing portion and a shielding portion.

3. The endcap of claim 2 wherein the shielding feature is not connected to the actuator arm.

4. The endcap of claim 2 wherein the balancing portion is shaped so the endcap is symmetric with respect to the shielding portion and the balancing portion.

5. The endcap of claim 1, wherein the shielding feature is structured to divert an airflow proximate to a portion of the head gimbal assembly that experiences windage excitation.

6. The endcap of claim 5 wherein the shielding feature is structured to divert airflow away from a windward side of the head gimbal assembly.

7. The endcap of claim 1 wherein the head gimbal assembly further comprises a load beam, a gimbal, a transducing head, and a flexible interconnect circuit, and wherein the shielding feature is structured to divert an airflow proximate to a critical portion of the flexible interconnect circuit.

8. The endcap of claim 1 disposed in relation to an X, Y and Z coordinate system, wherein an airflow in a substantially Z direction causes excitation of the head gimbal assembly, the shielding feature having a shape defined in a substantially X-Y plane for controlling the airflow, wherein the substantially X-Y plane is defined substantially parallel to the actuator arm.

9. The endcap of claim 1 disposed in relation to an X, Y and Z coordinate system, wherein an airflow in a substantially Y direction causes excitation of the head gimbal assembly, the shielding feature having a shape defined in a substantially X-Z plane for controlling the airflow, wherein the substantially X-Z plane is defined substantially parallel to an axis of rotation of the actuator arm.

10. A head actuation system comprising:
an actuator arm;
a head gimbal assembly for carrying a transducing head, the head gimbal assembly having a load beam connected to a first side of the actuator arm; and
a shield having a first portion attached to the actuator arm and a second cantilevered portion for reducing airflow excitation of the head gimbal assembly, wherein the shield is attached to a second side of the actuator arm that is opposite the first side of the actuator arm.

11. The head actuation system of claim 10, wherein the shield is attached to a first end of the load beam, and wherein the head gimbal assembly comprises:
a flexible interconnect circuit adjacent to the load beam and electrically connected to the transducing head;
a gimbal attached to a second end of the load beam; and
a slider supported by the gimbal, the slider disposed to support the transducing head.

12. The head actuation system of claim 10 wherein the shield is an endcap wherein the first portion of the shield is a body of the endcap and wherein the second portion of the shield is a symmetrical protrusion from the body of the endcap.

13. The head actuation system of claim 12 wherein the protrusion is T-shaped.

14. The head actuation system of claim 10 wherein the shield is an endcap connected to an end of the actuator arm to provide balancing, the endcap having a body and a plurality of protrusions from the body.

15. The head actuation system of claim 14 wherein the endcap is symmetrical with respect to an axis extending along a center length of the load beam.

16. The head actuation system of claim 15 wherein the protrusions form substantially a "C" shape.

17. The head actuation system of claim 16 wherein at least one of the plurality of protrusions has a first portion and a distal portion, the first portion defines a plane, and the distal portion defines another plane.

18. A shielded head actuation system comprising:
a rotatable actuator arm;
a head gimbal assembly attached to a first side of the actuator arm;
a rotatable magnetic disc, wherein the first side of the actuator arm is arranged to face the rotatable magnetic disc; and
a endcap comprising a body attached to the actuator arm and a symmetrically balanced shape feature, wherein the body of the endcap is attached to a second side of the actuator arm opposite the head gimbal assembly such that the shape feature is positioned adjacent to a top face of the head gimbal assembly in a cantilevered configuration to reduce airflow excitation of the head gimbal assembly, and wherein the endcap provides balancing to the actuator arm.

19. The shielded head actuation system of claim 18 wherein the symmetrically balanced shape feature is disposed proximate to an excitable portion of the head gimbal assembly to control excitation of the head gimbal assembly caused by airflow generated by rotating the magnetic disc.

20. The endcap of claim 1, wherein a portion of the head gimbal assembly defines a first plane and the shielding feature of the endcap defines a second plane that is arranged substantially parallel to and spaced from the first plane.

* * * * *